US009674736B2

(12) United States Patent
Yu et al.

(10) Patent No.: US 9,674,736 B2
(45) Date of Patent: Jun. 6, 2017

(54) METHOD AND SYSTEM FOR HANDOVER BETWEEN DIFFERENT NETWORKS, AND EVOLVED HIGH RATE PACKET DATA NETWORK

(75) Inventors: Yuanfang Yu, Shenzhen (CN); Ting Lu, Shenzhen (CN); Yonggang Fang, Shenzhen (CN); Xiaowu Zhao, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 408 days.

(21) Appl. No.: 14/426,711

(22) PCT Filed: Mar. 19, 2012

(86) PCT No.: PCT/CN2012/072559
§ 371 (c)(1),
(2), (4) Date: Mar. 6, 2015

(87) PCT Pub. No.: WO2012/152123
PCT Pub. Date: Nov. 15, 2012

(65) Prior Publication Data
US 2015/0282016 A1 Oct. 1, 2015

(30) Foreign Application Priority Data
Sep. 6, 2011 (CN) .......................... 2011 1 0261689

(51) Int. Cl.
*H04W 4/00* (2009.01)
*H04W 36/00* (2009.01)
(Continued)

(52) U.S. Cl.
CPC ... *H04W 36/0033* (2013.01); *H04W 36/0055* (2013.01); *H04W 76/04* (2013.01);
(Continued)

(58) Field of Classification Search
CPC ... H04W 36/00; H04W 36/14; H04W 36/033; H04W 76/04; H04W 84/02
(Continued)

(56) References Cited

U.S. PATENT DOCUMENTS

2006/0109818 A1* 5/2006 Ramanna ............. H04W 36/14
370/331
2006/0126564 A1* 6/2006 Ramanna ............. H04W 36/14
370/331
(Continued)

FOREIGN PATENT DOCUMENTS

CN 1756419 A 4/2006
CN 101772154 7/2010
(Continued)

OTHER PUBLICATIONS

International Search Report (Form PCT/ISA/210) for PCT/CN2012/072559 mailed Jun. 14, 2012.

*Primary Examiner* — Farah Faroul
(74) *Attorney, Agent, or Firm* — Koppel, Patrick, Heybl & Philpott (57) ABSTRACT

A method and system for handover between different networks and an eHRPD network are disclosed. The method includes that: the eHRPD network determines to hand over a terminal in an active state to a second network; the eHRPD network selects target network information used for the terminal handing over to the second network according to at least one of manners as follows: a measurement report of the second network reported by the terminal, second network information acquired from the second network and running information of the eHRPD network, wherein the target network information includes at least one of: a radio access technology type, frequency information, cell identification information and indication information returned in case of a handover failure; and the eHRPD network transmits the
(Continued)

target network information to the terminal through a redirection message or a connection closing message. According to the disclosure, system performance and user experience are improved.

20 Claims, 4 Drawing Sheets (51) Int. Cl.
    *H04W 76/04*    (2009.01)
    *H04W 36/14*    (2009.01)
    *H04W 48/16*    (2009.01)
    *H04W 84/02*    (2009.01)
    *H04W 88/10*    (2009.01)

(52) U.S. Cl.
    CPC ............ *H04W 36/14* (2013.01); *H04W 48/16* (2013.01); *H04W 84/02* (2013.01); *H04W 88/10* (2013.01)

(58) Field of Classification Search
    USPC ......................................................... 370/252
    See application file for complete search history.

(56) References Cited

U.S. PATENT DOCUMENTS

| | | | |
|---|---|---|---|
| 2008/0062955 A1* | 3/2008 | Gao | H04W 36/0066 370/348 |
| 2009/0016300 A1* | 1/2009 | Ahmavaara | H04W 36/0072 370/331 |
| 2009/0073933 A1* | 3/2009 | Madour | H04W 8/26 370/331 |
| 2010/0040024 A1* | 2/2010 | Wu | H04W 60/04 370/331 |
| 2010/0046428 A1* | 2/2010 | Lee | H04W 36/0094 370/328 |
| 2010/0208699 A1* | 8/2010 | Lee | H04W 36/0055 370/331 |
| 2011/0021158 A1* | 1/2011 | Xing | H04W 36/30 455/68 |
| 2011/0044264 A1* | 2/2011 | Chen | H04W 36/245 370/329 |
| 2011/0182268 A1* | 7/2011 | Akhtar | H04W 36/0022 370/331 |
| 2011/0194530 A1* | 8/2011 | Tinnakornsrisuphap | H04W 36/04 370/331 |
| 2011/0274089 A1* | 11/2011 | Yu | H04W 36/0011 370/331 |
| 2011/0296125 A1* | 12/2011 | Shaikh | G06F 21/30 711/159 |
| 2012/0040673 A1* | 2/2012 | Ying | H04W 36/14 455/436 |
| 2012/0069823 A1* | 3/2012 | Low | H04W 4/00 370/335 |

FOREIGN PATENT DOCUMENTS

| | | |
|---|---|---|
| CN | 101827412 A | 9/2010 |
| CN | 101932042 A | 12/2010 |
| CN | 102045804 | 5/2011 |
| CN | 102307375 A | 1/2012 |
| KR | 20090064285 A | 6/2009 |

* cited by examiner

METHOD AND SYSTEM FOR HANDOVER BETWEEN DIFFERENT NETWORKS, AND EVOLVED HIGH RATE PACKET DATA NETWORK

TECHNICAL FIELD

The disclosure relates to the field of communication, including e.g., a method and system for handover between different networks, and an Evolved High Rate Packet Data (eHRPD) network.

BACKGROUND

At present, the interoperation between a subsequent evolved network of a Code Division Multiple Access (CDMA) technology and a network of other radio access technology, particularly an Enhanced Universal Terrestrial Radio Access Network (E-UTRAN), is a development trend of wireless communication. However, the evolution from a CDMA network which has been commercialized, particularly an eHRPD network, to the E-UTRAN will be a complicated replacement process, and moreover, in such a replacement process, there may exist a long coexistence period at which the two wireless networks can be interconnected for intercommunication.

Figure 1:
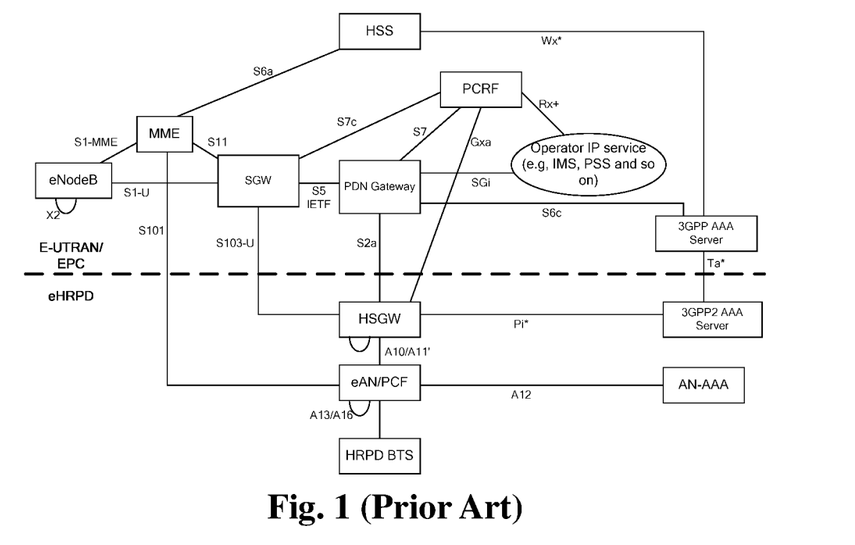
FIG. 1 is a diagram of a handover architecture for intercommunication between a CDMA2000 eHRPD network and an E-UTRAN according to a related art.

FIG. 1 is a diagram of a handover architecture for intercommunication between a CDMA2000 eHRPD network and an E-UTRAN in a related art, and as shown in FIG. 1, the eHRPD network comprises the following network elements: an Evolved Access Network (eAN), an Evolved Packet Control Function (ePCF), an HRPD Serving Gateway (HSGW) and the like; and the E-UTRAN comprises the following network elements: a Mobility Management Entity (MME), a Packet Data Network Gateway (PGW), a Serving Gateway (SGW), an E-TURAN base station and the like.

In a conventional solution to interoperation between the eHPRD network and the E-UTRAN, there are relatively detailed solutions to the active handover and idle handover from the E-UTRAN to the eHRPD network, but for the handover from the eHRPD network to the E-UTRAN, only idle handover is defined, and there is no detailed solution to the handover of a terminal in an active state in the eHRPD network to the E-UTRAN.

Along with the deployment of the E-UTRAN, a requirement of the terminal in the active state in the eHRPD network on handover to the E-UTRAN gradually emerges, and for example, when there are a huge number of terminals in the active state in the eHRPD network, the eHRPD network may be overloaded and heavily loaded; and in addition, along with the wide popularization of intelligent terminals, a great number of high-bandwidth services appear, the E-UTRAN has high-bandwidth service supporting performance higher than that of the eHRPD network, but the terminals cannot enjoy E-UTRAN service in all areas because the E-UTRAN may be deployed in a hotspot coverage manner in an early stage, and the eHRPD network has a wider coverage, so that service may be provided for the terminals initially by the eHRPD network.

SUMMARY

A solution for handover between different networks is provided in the disclosure, so as to solve the problem of how to hand over a terminal in an active state in an eHRPD network to an E-UTRAN in the related art.

According to one aspect of the disclosure, a method for handover between different networks is provided.

According to an embodiment of the disclosure, the method for handover between the different networks includes that: an eHRPD network determines to hand over a terminal in an active state to a second network; the eHRPD network selects target network information used for the terminal handing over to the second network according to at least one of manners as follows: a measurement report of the second network reported by the terminal, second network information acquired from the second network and running information of the eHRPD network, wherein the target network information includes at least one of: a radio access technology type, frequency information, cell identification information and indication information returned in case of a handover failure; and the eHRPD network transmits the target network information to the terminal through a redirection message or a connection closing message.

According to an embodiment of the disclosure, before the eHRPD network selects the target network information through the measurement report of the second network reported by the terminal, the method further includes that: the eHRPD network transmits a measurement request for indicating the terminal to measure the second network to the terminal, wherein the measurement request includes at least one of: the radio access technology type, the frequency information and threshold information.

According to an embodiment of the disclosure, before the eHRPD network transmits the measurement request to the terminal, the method further includes that: the eHRPD network determines that the terminal supports measurement operation between the different networks through a negotiated parameter.

According to an embodiment of the disclosure, before the eHRPD network selects the target network information through the second network information acquired from the second network, the method further includes that: the eHRPD network acquires the second network information through an interface between the eHRPD network and the second network, wherein the second network information includes at least one of: state information of the second network, load information of the second network and system parameter information of the second network.

According to an embodiment of the disclosure, before the eHRPD network determines to hand over the terminal to the second network, the method further includes that: the eHRPD network is overloaded; or the terminal is executing a high-bandwidth service.

According to an embodiment of the disclosure, after the eHRPD network determines to hand over the terminal to the second network, the method further includes at least one of: the eHRPD network stops charging operation over the terminal; and after the terminal is handed over to the second network, the second network notifies the eHRPD network that the handover of the terminal is completed.

According to an embodiment of the disclosure, the second network notifies the eHRPD network that the handover of the terminal is completed includes that: the second network notifies the eHRPD network to perform resource de-allocating operation.

According to an embodiment of the disclosure, a measurement result includes at least one of: the radio access technology type, the frequency information, the cell identification information, signal quality information, signal strength information and availability information of the radio access technology type.

According to an embodiment of the disclosure, the second network is at least one of: an E-UTRAN, a Wireless Local Area Network (WLAN) and a wireless broadband network.

According to another aspect of the disclosure, an eHRPD network is further provided.

The eHRPD network in the embodiment of the disclosure includes: a determining element, configured to determine to hand over a terminal in an active state to a second network; a selecting element, configured to select target network information used for the terminal handing over to the second network according to at least one of manners as follows: a measurement report of the second network reported by the terminal, second network information acquired from the second network and running information of the eHRPD network, wherein the target network information includes at least one of: a radio access technology type, frequency information, cell identification information and indication information returned in case of a handover failure; and a transmitting element, configured to transmit the target network information to the terminal through a redirection message or a connection closing message.

According to one aspect of the disclosure, a system for handover between different networks is provided.

The system for handover between the different networks in the embodiment of the disclosure includes an E-UTRAN and the above eHRPD network, wherein the E-UTRAN is the second network.

According to the disclosure, the eHRPD network carries the selected target network information for the terminal handing over to the second network into the redirection message, and transmits the target network information to the terminal, so that the problem of how to hand over the terminal in the active state in the eHRPD network to the E-UTRAN in the related art is solved, and system performance and user experience are improved.

BRIEF DESCRIPTION OF THE DRAWINGS

The drawings are described here to provide further understanding of the disclosure, and form a part of the disclosure. The schematic embodiments and description of the disclosure are adopted to explain the disclosure, and do not form improper limits to the disclosure. In the drawings.

DETAILED DESCRIPTION OF THE EMBODIMENTS

The disclosure is described below with reference to the drawings and embodiments in detail. It should be noted that the embodiments of the disclosure and the characteristics in the embodiments can be combined under the condition of no conflicts.

Figure 2:
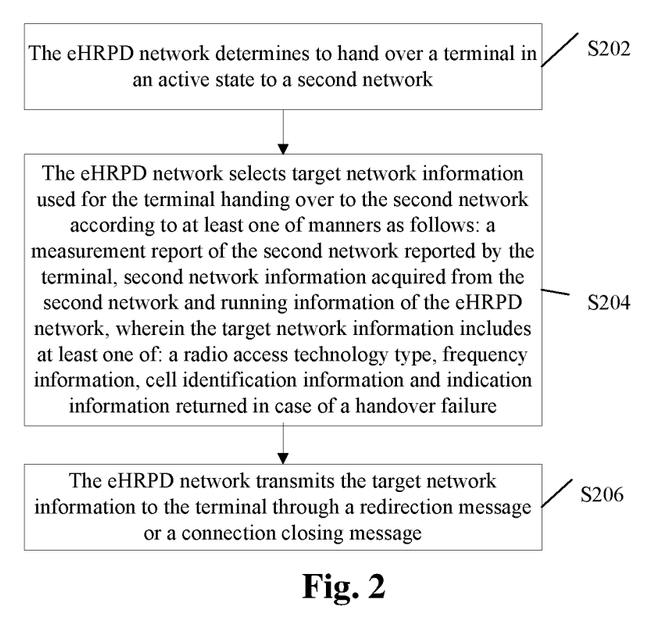
FIG. 2 is a flowchart of a method for handover between different networks according to an embodiment of the disclosure.

According to the embodiment of the disclosure, a method for handover between different networks is provided. FIG. 2 is a flowchart of a method for handover between different networks according to an embodiment of the disclosure, and as shown in FIG. 2, the method includes that:

Step 202: An eHRPD network determines to hand over a terminal in an active state to a second network;

Step 204: The eHRPD network selects target network information used for the terminal handing over to the second network according to at least one of manners as follows: a measurement report of the second network reported by the terminal, second network information acquired from the second network and running information of the eHRPD network, wherein the target network information includes at least one of: a radio access technology type, frequency information, cell identification information and indication information returned in case of a handover failure; and Step 206: The eHRPD network transmits the target network information to the terminal through a redirection message or a connection closing message.

By the steps, the eHRPD network carries the selected target network information used for the terminal handing over to the second network into the redirection message, and transmits the target network information to the terminal, so that the problem of how to hand over the terminal in an active state in the eHRPD network to an E-UTRAN in the related art is solved, and system performance and user experience are improved.

For example, in Step 206, the eHRPD network can transmits the target network information to the terminal through an inter-different system redirection message.

According to an embodiment of the disclosure, before the eHRPD network selects the target network information through the measurement report of the second network reported by the terminal in Step 204, the eHRPD network can transmit a measurement request for indicating the terminal to measure the second network to the terminal, wherein the measurement request includes at least one of: the radio access technology type, the frequency information and threshold information. By such a method, a mode of actively transmitting the measurement request to the terminal by the eHRPD network is adopted, and then the terminal reports the measurement report of the second network to the eHRPD network, which is used to the eHRPD network to select the target network information for the terminal, so that handover efficiency and accuracy can be improved.

According to an embodiment of the disclosure, before the eHRPD network transmits the measurement request to the terminal, the eHRPD network can determine that the terminal supports measurement operation between the different networks through a negotiated parameter. By such a method, system effectiveness can be improved.

According to an embodiment of the disclosure, before the eHRPD network selects the target network information through the second network information acquired from the second network in Step 204, the eHRPD network can acquire the second network information through an interface between the eHRPD network and the second network, wherein the second network information includes at least one of: state information of the second network, load information of the second network and system parameter information of the second network. By such a method, handover effectiveness can be improved.

According to an embodiment of the disclosure, before Step 202, the eHRPD network is overloaded; or the terminal is executing a high-bandwidth service. That is, when the current eHRPD network is overloaded or the terminal is executing the high-bandwidth service, the eHRPD network can hand over the terminal in the active state to the second network, for example, an E-UTRAN, so that system stability can be enhanced, a resource utilization rate can be increased, and the user experience can be improved.

According to an embodiment of the disclosure, after Step 202, the method can further include at least one of: the eHRPD network stops charging operation over the terminal; and after the terminal is handed over to the second network, the second network notifies the eHRPD network that the handover of the terminal is completed. By such a method, system accuracy can be improved.

Wherein, the second network notifies the eHRPD network that the handover of the terminal is completed includes that: the second network notifies the eHRPD network to perform resource de-allocating operation. The method is simple, practical and high in operability.

According to an embodiment of the disclosure, when the eHRPD network selects the target network information according to the measurement report of the second network reported by the terminal in Step 204, a measurement result includes at least one of: the radio access technology type, the frequency information, the cell identification information, signal quality information, signal strength information and availability information of the radio access technology type. By such a method, system processing efficiency can be improved.

According to an embodiment of the disclosure, the second network may be at least one of: an E-UTRAN, a WLAN and a wireless broadband network such as Wireless Fidelity (WiFi) and Worldwide Interoperability for Microwave Access (WiMax).

Figure 3:
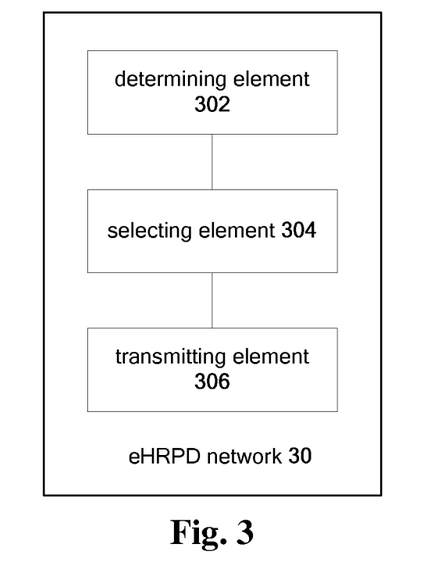
FIG. 3 is a structure diagram of an eHRPD network according to an embodiment of the disclosure.

An eHRPD network corresponding to the method is provided in the embodiment of the disclosure. FIG. 3 is a structure diagram of an eHRPD network according to an embodiment of the disclosure, and as shown in FIG. 3, the eHRPD network 30 includes: a determining element 302, configured to determine to hand over a terminal in an active state to a second network; a selecting element 304, configured to select target network information used for the terminal handing over to the second network according to at least one of manners as follows: a measurement report of the second network reported by the terminal, second network information acquired from the second network and running information of the eHRPD network, wherein the target network information comprises at least one of: a radio access technology type, frequency information, cell identification information and indication information returned in case of a handover failure; and a transmitting element 306, configured to transmit the target network information to the terminal through a redirection message or a connection closing message.

By the eHRPD network 30, the target network information selected by the selecting element 304 is carried in a redirection, wherein the target network information is used for the terminal handing over to the second network, and then the target network information is transmitted to the terminal by the transmitting element 306, so that the problem of how to hand over the terminal in the active state in the eHRPD network to an E-UTRAN in the related art is solved, and the system performance and the user experience are improved.

Figure 4:
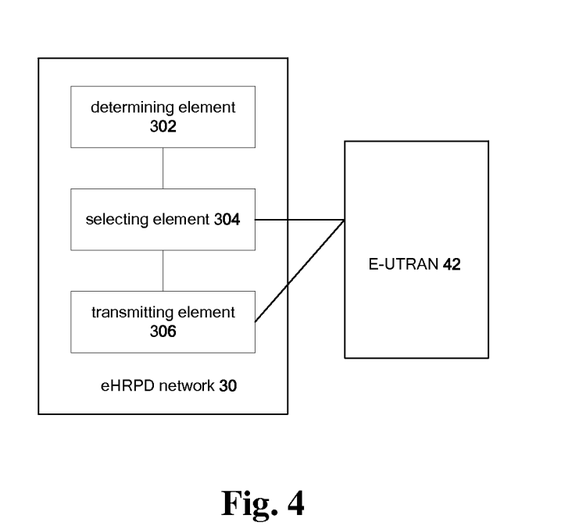
FIG. 4 is a structure diagram of a system for handover between different networks according to an embodiment of the disclosure.

According to the embodiment of the disclosure, a system for handover between different networks is also provided. FIG. 4 is a structure diagram of a system for handover between different networks according to an embodiment of the disclosure, and as shown in FIG. 4, the system 40 includes an E-UTRAN 42 and the above eHRPD network 30, wherein the E-UTRAN 42 is the second network.

An implementation process of the above embodiment is described below with reference to preferred embodiments and the drawings in detail.

Embodiment 1

A method for the handover of a terminal in an active state from an eHRPD network to an E-UTRAN is provided, so as to provide a more complete solution to interoperability between the eHRPD network and the E-UTRAN and meet the requirements of the performance improvement of the terminal and the networks.

In the implementation process, the method for the handover of the terminal in the active state from the eHRPD network to the E-UTRAN in the eHRPD network may include that:

Step 1: When the eHRPD network determines to hand over the terminal in the active state to a second network including the E-UTRAN, the eHRPD network requests the terminal to measure the second network, and determines target network information for the handover of the terminal according to the measurement result reported by the terminal and/or information acquired from the second network;

Step 2: The eHRPD network transmits the target network information to the terminal;

Step 3: The eHRPD network stops charging operation over the terminal; and Step 4: After the terminal is handed over to the second network, the second network notifies the eHRPD network that the handover is completed.

According to an embodiment of the disclosure, whether measurement operation between different systems is supported or not can be determined through a negotiated parameter between the eHRPD network and the terminal. For example, when the eHRPD network determines to hand over the terminal in the active state to the second network including the E-UTRAN, based on that the measurement operation between the different systems is determined to be supported, the eHRPD network transmits a measurement request carrying the second network information to the terminal, and/or the terminal transmits a measurement report carrying a second network measurement result, wherein the measurement result includes at least one of: a radio access technology type, frequency information, cell identification information, signal quality information and signal strength information; or based on that there is no parameter indicating whether the measurement operation between the different systems (i.e. different networks) is supported or not, when the eHRPD network determines to hand over the terminal in the active state to the second network including the E-UTRAN, the eHRPD network determines whether to transmit the measurement request carrying the second network information or not by itself. Wherein, the measurement request may include at least one of: the radio access technology type, the frequency information and threshold information.

According to an embodiment of the disclosure, the eHRPD network can acquire the second network information through an interface between the eHRPD network and the second network, and the second network information may include: state information, load information and system parameter information.

According to an embodiment of the disclosure, the target network information may include at least one of: the radio access technology type, the frequency information, the cell identification information and indication information returned in case of a failure.

According to an embodiment of the disclosure, the eHRPD network stops the charging operation over the terminal in Step 3 may include that: the charging stopping operation and the operation of the eHRPD network transmitting the target network information for handover to the terminal can be simultaneously performed; or the operation of the eHRPD network transmitting the target network information for handover to the terminal is performed at first, and then the charging stopping operation is performed; or the charging stopping operation is performed at first, and then the operation of t the eHRPD network transmitting the target network information for handover to the terminal is performed.

According to an embodiment of the disclosure, the second network notifies the eHRPD network that the handover is completed in Step 4 may include that: the second network notifies the eHRPD network that resource de-allocating operation can be performed.

Embodiment 2

Figure 5:
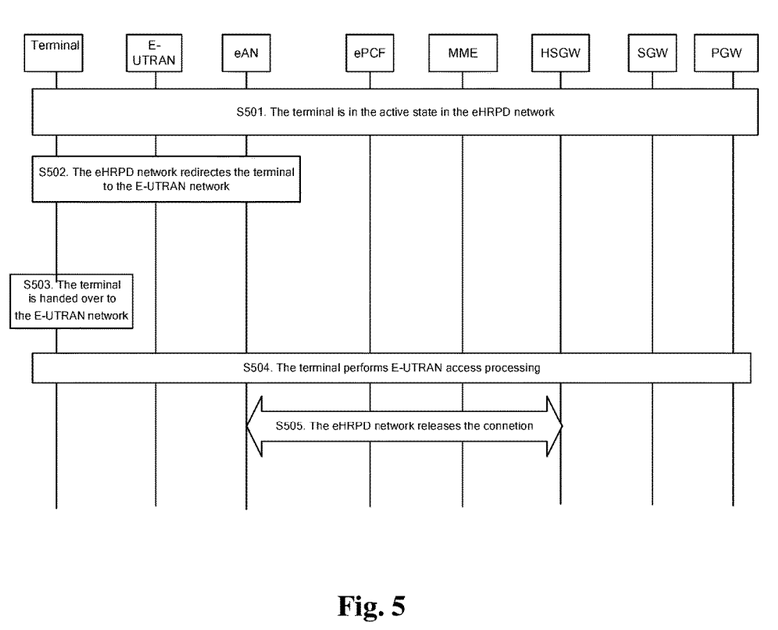
FIG. 5 is a flowchart of handover of a terminal in an active state in an eHRPD network to an E-UTRAN according to embodiment 2 of the disclosure.

FIG. 5 is a flowchart of handover of a terminal in an active state from an eHRPD network to an E-UTRAN according to embodiment 2 of the disclosure, and as shown in FIG. 5, a handover flow includes that:

Step 501: The terminal is in the active state in the eHRPD network.

Step 502: The eHRPD network redirects (i.e. hands over) the terminal to the E-UTRAN.

Step 503: The terminal is handed over to the E-UTRAN.

Step 504: The terminal performs E-UTRAN access processing, wherein such a process includes operation of notifying the eHRPD network to execute resource de-allocation.

Step 505: the eHRPD network performs connection releasing operation in case of timeout of a context maintenance timer of the terminal.

Embodiment 3

Figure 6:
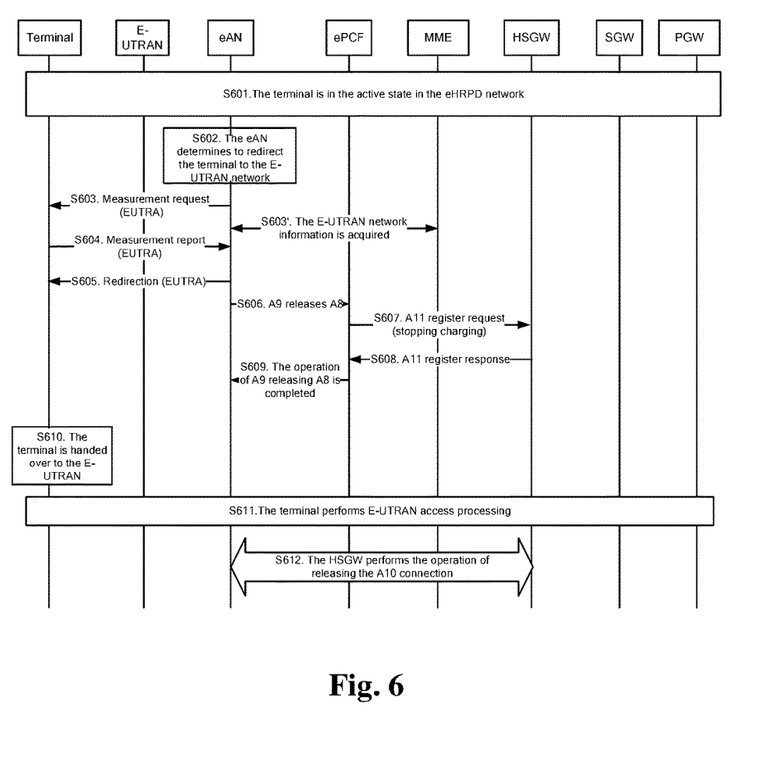
FIG. 6 is a detailed flowchart of handover of a terminal in an active state in an eHRPD network to an E-UTRAN according to embodiment 3 of the disclosure.

FIG. 6 is a detailed flowchart of handover of a terminal in an active state in an eHRPD network to an E-UTRAN according to embodiment 3 of the disclosure, and as shown in FIG. 6, a handover flow includes that:

Step 601: The terminal is in the active state in the eHRPD network.

Step 602: Based on some triggering, such that the eHRPD network is overload or the terminal is executing the high-bandwidth service, an eAN determines to redirects (i.e. hands over) the terminal to the E-UTRAN.

Step 603: The eAN transmits a measurement request carrying E-UTRA information to the terminal; and the eAN is required to confirm through a negotiated parameter and the like that the terminal supports measurement operation between different networks before transmitting the measurement request. For example, the measurement request may be a route updating request message or a measurement request message. Preferably, at the same time of or after the step, the eAN can acquire E-UTRAN information such as state information and load information through an interface between the eAN and the E-UTRAN.

Step 604: the terminal reports a measurement result to the eAN, and the eAN selects target network information, such as a frequency of the E-UTRAN and a cell and so on, for handover according to at least one of: the measurement result reported by the terminal, the acquired E-UTRAN information, own running information of the eHRPD network.

Step 605: The eAN transmits a redirection message carrying the target network information to the terminal.

Step 606: The eAN transmits a message of releasing A8 by A9 to an ePCF to initiate A8 connection releasing, wherein the message carries a cause value "group call for entering dormancy".

Step 607: The ePCF transmits an A11 registration request message to an HSGW to request to stop charging, wherein the message carries a record of activating the charging stopping.

Step 608: The HSGW transmits an A11 registration response message to the ePCF.

Step 609: The ePCF transmits a message indicating A9 finishes releasing A8 to the eAN Step 610: After Step 605, the terminal is handed over to the E-UTRAN.

Step 611: The terminal performs E-UTRAN access processing, wherein such a process includes operation of a PGW notifying the HSGW to execute resource de-allocation.

Step 612: The HSGW performs connection releasing operation in case of timeout of a context maintenance timer of the terminal.

Obviously, when there are a huge number of terminals in the active state in the eHRPD network, the eHRPD network may be overloaded, and when the eHRPD network knows that there are other networks such as the E-UTRAN in its adjacent area at this time, the terminals can be handed over to the other networks such as the E-UTRAN by virtue of the mode in the embodiment, so that the load of the eHRPD network is reduced, and better service can be provided for a user. In addition, in the embodiment, once the terminal in the active state enters an E-UTRAN area, the eHRPD network may actively hand over the terminal to the E-UTRAN, and higher-quality service is provided for the user by virtue of the E-UTRAN.

It should be noted that the second network in the embodiment is only described by taking the E-UTRAN as an example, and the second network may also be a WLAN or a wireless broadband network such as WiFi and WiMax.

From the above, according to the embodiment of the disclosure, the eHRPD network carries the selected target network information used for the terminal handing over to the second network into the redirection message, and transmits the target network information to the terminal, so that the problem of how to hand over the terminal in the active state in the eHRPD network to the E-UTRAN in the related art is solved, and the system performance and the user experience are improved.

Obviously, those skilled in the art should know that each module or step of the disclosure can be implemented by a universal computing device, and the modules or steps can be concentrated on a single computing device or distributed on a network formed by a plurality of computing devices, and can optionally be implemented by programmable codes executable for the computing devices, so that the modules or steps can be stored in a storage device for execution with the computing devices, or can form each integrated circuit module, or multiple modules or steps therein can form a single integrated circuit module for implementation. As a consequence, the disclosure is not limited to any specific hardware and software combination.

The above is only the preferred embodiment of the disclosure and not intended to limit the disclosure, and for those skilled in the art, the disclosure can have various modifications and variations. Any modifications, equivalent replacements, improvements and the like within the spirit and principle of the disclosure shall fall within the scope of protection of the disclosure.

What is claimed is:

1. A method for handover between different networks, comprising:
  determining, by an Evolved High Rate Packet Data (eHRPD) network, to hand over a terminal in an active state to a second network;
  acquiring, by the eHRPD network, target network information used for the terminal handing over to the second network according to at least one of manners as follows: a measurement report of the second network reported by the terminal, second network information acquired from the second network and running information of the eHRPD network, wherein the target network information comprises at least one of: a radio access technology type, frequency information, cell identification information and indication information returned in case of a handover failure; and
  transmitting, by the eHRPD network, the target network information to the terminal through a redirection message or a connection closing message.

2. The method according to claim 1, before acquiring, by the eHRPD network, the target network information through the measurement report of the second network reported by the terminal, further comprising:
  transmitting, by the eHRPD network, to the terminal, a measurement request indicating the terminal to measure the second network, wherein the measurement request comprises at least one of: the radio access technology type, the frequency information and threshold information.

3. The method according to claim 2, before transmitting, by the eHRPD network, the measurement request to the terminal, further comprising:
  determining, by the eHRPD network, that the terminal supports measurement operation between the different networks through a negotiated parameter.

4. The method according to claim 3, wherein a measurement result comprises at least one of: the radio access technology type, the frequency information, the cell identification information, signal quality information, signal strength information and availability information of the radio access technology type.

5. The method according to claim 4, wherein the second network is at least one of: an Enhanced Universal Terrestrial Radio Access Network (E-UTRAN), a wireless local area network and a wireless broadband network.

6. The method according to claim 2, wherein a measurement result comprises at least one of: the radio access technology type, the frequency information, the cell identification information, signal quality information, signal strength information and availability information of the radio access technology type.

7. The method according to claim 6, wherein the second network is at least one of: an Enhanced Universal Terrestrial Radio Access Network (E-UTRAN), a wireless local area network and a wireless broadband network.

8. The method according to claim 1, before acquiring, by the eHRPD network, the target network information through the second network information acquired from the second network, further comprising:
  acquiring, by the eHRPD network, the second network information through an interface between the eHRPD network and the second network, wherein the second network information comprises at least one of: state information of the second network, load information of the second network and system parameter information of the second network.

9. The method according to claim 8, wherein a measurement result comprises at least one of: the radio access technology type, the frequency information, the cell identification information, signal quality information, signal strength information and availability information of the radio access technology type.

10. The method according to claim 9, wherein the second network is at least one of: an Enhanced Universal Terrestrial Radio Access Network (E-UTRAN), a wireless local area network and a wireless broadband network.

11. The method according to claim 1, before determining, by the eHRPD network, to hand over the terminal to the second network, further comprising:
  overloading, by the eHRPD network; or
  executing, by the terminal, a high-bandwidth service.

12. The method according to claim 11, wherein a measurement result comprises at least one of: the radio access technology type, the frequency information, the cell identification information, signal quality information, signal strength information and availability information of the radio access technology type.

13. The method according to claim 1, after determining, by the eHRPD network, to hand over the terminal to the second network, further comprising at least one of:
  stopping, by the eHRPD network, charging operation over the terminal; and
  after the terminal is handed over to the second network, notifying, by the second network, the eHRPD network that the handover of the terminal is completed.

14. The method according to claim 13, wherein notifying, by the second network, the eHRPD network that the handover of the terminal is completed comprises: notifying, by the second network, the eHRPD network to perform resource de-allocating operation.

15. The method according to claim 14, wherein a measurement result comprises at least one of: the radio access technology type, the frequency information, the cell identification information, signal quality information, signal strength information and availability information of the radio access technology type.

16. The method according to claim 13, wherein a measurement result comprises at least one of: the radio access technology type, the frequency information, the cell identification information, signal quality information, signal strength information and availability information of the radio access technology type.

17. The method according to claim 1, wherein a measurement result comprises at least one of: the radio access technology type, the frequency information, the cell identification information, signal quality information, signal strength information and availability information of the radio access technology type.

18. The method according to claim 17, wherein the second network is at least one of: an Enhanced Universal Terrestrial Radio Access Network (E-UTRAN), a wireless local area network and a wireless broadband network.

19. An Evolved High Rate Packet Data (eHRPD) network system, comprising a hardware processor configured to execute program units stored on a memory, the program units comprising:
  a determining element, configured to determine to hand over a terminal in an active state to a second network;

an acquiring element, configured to acquire target network information used for the terminal handing over to the second network according to at least one of: a measurement report of the second network reported by the terminal, second network information acquired from the second network and running information of the eHRPD network, wherein the target network information comprises at least one of: a radio access technology type, frequency information, cell identification information and indication information returned in case of a handover failure; and a transmitting element, configured to transmit the target network information to the terminal through a redirection message or a connection closing message.

20. A system for handover between different networks, comprising an Enhanced Universal Terrestrial Radio Access Network (E-UTRAN) and the eHRPD network system according to claim 19, wherein the E-UTRAN is the second network.

\* \* \* \* \*